(12) United States Patent
Berstis

(10) Patent No.: US 6,243,091 B1
(45) Date of Patent: *Jun. 5, 2001

(54) GLOBAL HISTORY VIEW

(75) Inventor: Viktors Berstis, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,403

(22) Filed: Nov. 21, 1997

(51) Int. Cl.[7] .................................................. G06F 3/00
(52) U.S. Cl. .......................... 345/349; 345/357; 345/356; 345/348; 707/501
(58) Field of Search ................................... 345/357, 356, 345/349, 348, 346, 350, 419, 355; 707/501

(56) References Cited

U.S. PATENT DOCUMENTS

| | | | |
|---|---|---|---|
| 5,528,735 | * | 6/1996 | Strasnick et al. ..................... 345/327 |
| 5,555,354 | * | 9/1996 | Strasnick et al. ..................... 345/327 |
| 5,727,129 | * | 3/1998 | Barrett et al. ........................... 706/10 |
| 5,768,578 | * | 6/1998 | Kirk et al. ............................. 707/100 |
| 5,786,820 | * | 7/1998 | Robertson ............................ 345/357 |
| 5,808,613 | * | 9/1998 | Marrin et al. ......................... 345/355 |
| 5,854,630 | * | 12/1998 | Nielsen ................................. 345/352 |
| 6,018,344 | * | 1/2000 | Harada et al. ........................ 345/357 |

OTHER PUBLICATIONS

Smart Browser (Http://www.smartbrowser.com/), Aug. 8, 1997.

* cited by examiner

Primary Examiner—Raymond J. Bayerl
Assistant Examiner—Cuong T. Thai
(74) Attorney, Agent, or Firm—Jeffrey S. Labaw

(57) ABSTRACT

The history of browsing in a distributed database, such as the Internet, is presented in a global history window. Each document browsed is represented by a page icon selected as representative of content in the browsed document. Each link between browsed pages is represented by a roadway to connect the respective selected page icons. The user's present position is indicated by an icon or other manner. Features proximate to the user's present position may be enlarged. In the preferred embodiment, the global history map is presented on an apparently curved surface having a variety of features which serve to orient the user in the map. With each new request for retrieval of a new document, the global history map window is presented wherein the building of a new roadway serves as a progress indicator for retrieving the new document. A new page icon indicative of the content of the new document is selected. The new page icon is presented proximate to a terminus of the new roadway. An end of road icon at the terminus of the new roadway is presented once the new document is retrieved.

33 Claims, 13 Drawing Sheets

GLOBAL HISTORY VIEW

BACKGROUND OF THE INVENTION

This invention relates generally to retrieval of information in an information handling network. More particularly, it relates to techniques for recording and presenting one or more sessions of a search session in a distributed environment such as Web browsing in the Internet. Further, it relates to techniques for using the user interface of the present invention for navigating through a distributed data set such as the Internet.

It is well known to couple a plurality of computer systems into a network of computer systems. In this way, the collective resources available within the network may be shared among users, thus allowing each connected user to enjoy resources which would not be economically feasible to provide to each user individually. With the growth of the Internet, sharing of computer resources has been brought to a much wider audience; it has become a cultural medium in today's society for both information and entertainment. Government agencies employ Internet sites for a variety of informational purposes. For many companies, their Internet sites are an integral part of their business; they are frequently mentioned in the companies' television, radio and print advertising.

The World Wide Web, or simply "the web", is the Internet's multimedia information retrieval system. It is the most commonly used method of transferring data in the Internet environment. Other methods exist such as the File Transfer Protocol (FTP) and Gopher, but have not achieved the popularity of the Web. Client machines accomplish transactions to Web servers using the Hypertext Transfer Protocol (HTTP), which is a known application protocol providing users access to files, e.g., text, graphics, images, sound, video, using a standard page description language known as the Hypertext Markup Language (HTML). HTML provides basic document formatting and allows the developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g., Netscape Navigator, at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object. If the server is not available or overloaded, however, the user may receive an error message, e.g., "server not responding" or the like.

After some amount of browsing in the Web, a user can become quite confused as to where he has been and how to return to a site which he has previously browsed. The present browser interface does not show a history of the Web sites visited by a user during a current or past web browsing session in an easily understood manner. At most, prior art web browsers have a list of URLs which the user has browsed in the current session in a chronological order. This is deficient for at least two reasons. The URLs are often in a very arcane format, particularly for the inexperienced user. The URLs themselves are poorly understood and not sufficiently associated in the minds of the users to enable them to use the URLs to return to a desired page. This is particularly true where the URL was reached by hyperlink, i.e. the user never typed the URL.

The chronological listing of the URLs does little to show the relationship between the web pages. Nor does it show the user whether the navigation between pages was accomplished by a bookmark, typing in the URL or due to a hyperlink in the previous page. The mode of navigation would be a helpful clue as to the identity of a page.

This invention provides an improved user interface for presenting and navigating through a history of web browsing.

SUMMARY OF THE INVENTION

Therefore, it is an object of the invention to present a history of web browsing in an intelligible and informative manner.

It is another object of the invention to distinguish between different sessions of web browsing.

It is another object of the invention to differentiate between links reached in different browser operations.

It is another object of the invention to retrieve web pages from previous visits.

It is another object of the invention to navigate through a history of web browsing to retrieve documents from previously visited sites.

These and other objects are accomplished by presenting the history of browsing in a distributed database, such as the Internet in a global history window. Each document browsed is represented by a page icon selected as representative of content in the browsed document. Each link between browsed pages is represented by a roadway to connect the respective selected page icons. In the preferred embodiment, the global history map is presented on an apparently curved surface having a variety of features which serve to orient the user in the map.

With each new request for retrieval of a new document, the global history map window is presented wherein the building of a new roadway serves as a progress indicator for retrieving the new document. A new page icon indicative of the content of the new document is selected. The new page icon is presented proximate to a terminus of the new roadway. An end of road icon at the terminus of the new roadway is presented once the new document is retrieved.

An indicator of the user's present position in the global history map is presented, e.g, a searchlight icon. A page icon at the present position in the global history map is enlarged and represents the document which can be presently retrieved. The enlarged page icon shows more detail concerning the document than the page icon in its unenlarged state.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
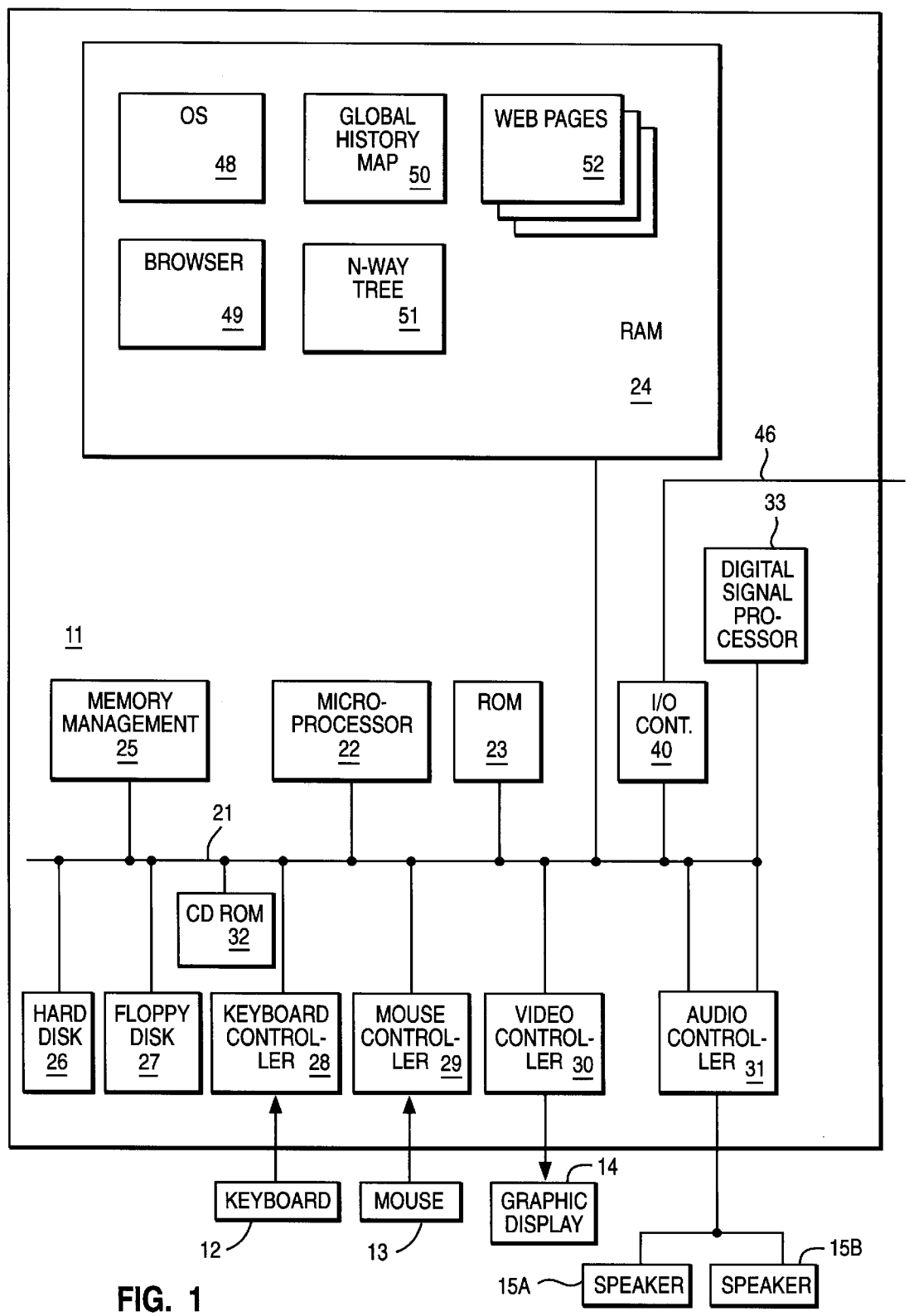
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others ay be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a computer readable medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

Figure 2:
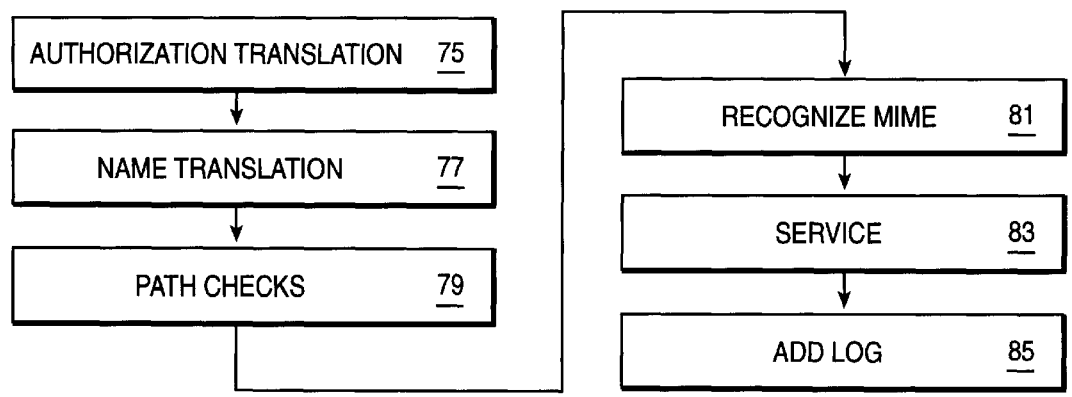
FIG. 2 is a flowchart for retrieving a web document in the Internet.

In the Internet, the Web server accepts a web client request and returns a response back to the client. A series of server computers may be involved in the retrieval of a specific web page. The operation of the server program is governed by a number of server application functions (SAFs), each of which is configured to execute in a certain step of a sequence. This sequence, illustrated in FIG. 2, begins with the authorization translation step 75 during which the web server translates any authorization information sent by the web client into a user and a group. If necessary, the step 75 may decode a message to get the actual client request. At the name translation step 77, the URL associated with the request may or may not be translated into a system dependent file name, a redirection URL or a mirror site. In the path checks step 79, the server performs various tests on the resulting path to ensure that the given client may retrieve the document.

In step 81, Multipurpose Internet Mail Extension (MIME) type information, e.g., text/html, image/gif, for the given document is recognized. In the service step 83, the Web server routine selects an internal server function to send the retrieved information back to the requesting web client. This function can run the normal server service routine to return a file or some other server function, such as a program to return to return a custom document or a CGI program. At the Add Log step 85, information about the transaction is recorded.

A URL or "Uniform Resource Locator" is defined in RFC 1945, which is incorporated herein by reference. As is well known, the URL is typically of the format: http://somehost/. . . " where "somehost" is the hostname position of the URL. The usual manner in which a URL is resolved into an actual IP address for a web server is through the use of a nameserver. In an internet or intranet network, a nameserver maps hostnames in URLs to actual network addresses. An example of a nameserver is the Domain Name Service (DNS) currently implemented in the Internet. The process of having a Web client request a hostname and address from a nameserver is sometimes called resolution. In TCP/IP, the nameserver resolves the hostname into a list of one or more IP addresses which are returned to the Web client on an HTTP request. Each IP address identifies a server which hosts the requested content desired by the browser.

In prior art browsers, a certain level of historical information is kept to aid in navigation in the browser. Typically, this information is used to retrieve web pages in response to actuation of the "Forward" and "Back" buttons in the user interface. In at least one prior art browser, the user can look at a list of URLs for previously viewed web pages arranged in a chronological order. The deficiencies of this arrangement have already been discussed.

In the present invention, a much more powerful history mechanism is provided with the browser. Although modifications to the browser code can be made, the invention can also be implemented as a browser plug-in or helper application. To store the amount of information needed for the user interface of the global history view window, a somewhat more extensive local cache containing an N-way tree data structure, technically a directed graph, is used in the preferred embodiment. This data structure is discussed below in greater detail in association with FIG. 8.

Figure 3:
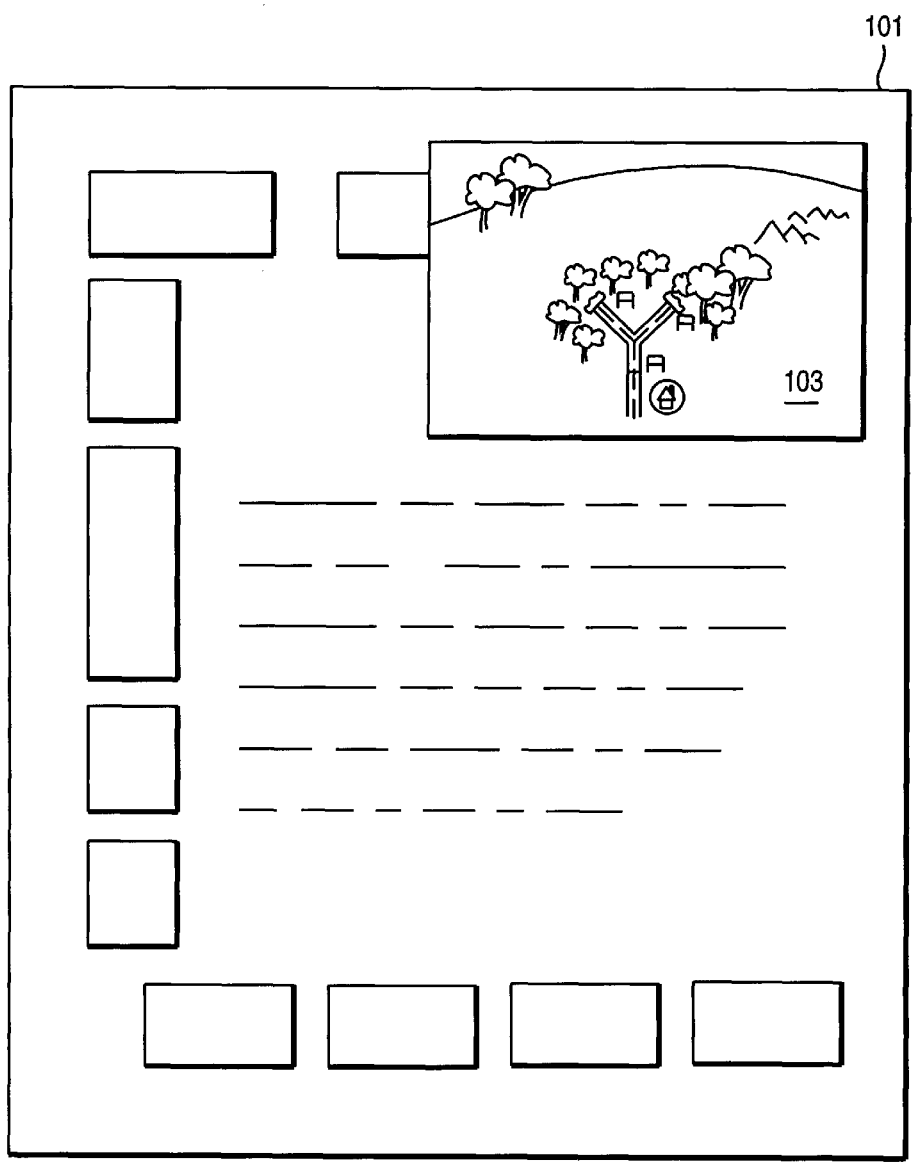
FIG. 3 depicts a web browser equipped with a main window for browsing a web page and a window for the global history view.

FIG. 3 shows a main window 101 of the browser which is used to present the web page. The term "web page" should be construed to mean the file retrieved during the browsing operation. Those familiar with the art are aware that a web page may in fact contain a plurality of actual pages of text and graphics. Program files can also be retrieved in a browsing operation. The global history view window 103 shows the history and progress of the user's web browsing. In a preferred embodiment, the window 103 is presented as a three dimensional or virtual reality interface. The relative sizes of the windows 101 and 103 is a design choice in which the desired level of detail in the global history window 103 may be a consideration.

In the preferred embodiment, the global history window 103 is invoked in two situations: the request to retrieve a new web document from a new web site and an explicit request to activate the window 103. The first situation can be invoked when the user requests a new page by hyperlink, typing in a URL or by selecting a bookmark in the bookmark list of the browser. In such a case, the global history view window 103 will pop-up, show the progress of retrieving the link and present an icon by which the web page or content represented by the selected URL will be represented. After a predetermined period, the global view window 103 will be hidden or minimized as an icon to allow the full web page to be viewed in the main window. If deemed distracting, the user can have the option to configure the global history window 103 to appear only when explicitly requested. However, this is deemed to be less desirable, since the user will not have seen the icon by which the web page is represented. This will make subsequent navigation in the window more difficult.

The user can also explicitly invoke the global history window 103 presentation. This action can be performed by any number of standard methods known to those skilled in the art of user interfaces: selection of an icon, pressing a key or set of keys on an input device, selection in a pulldown menu, activation of a control and so forth. In one preferred embodiment, if the user has paused on a page for a period of time, e.g., five minutes, without any user input indicating that the user might still be engaged with the page, the global history window is presented.

Explicit invocation of the global history window 103 generally occurs because the user wishes to use it to navigate to a previously visited web site. Alternatively, the user may simply wish to gain a better understanding of the relationship of the current web site to other sites. In either case, since the global history window 103 is now the prime focus of the user's attention, it may be presented in a full screen window. This facilitates the virtual reality experience of the preferred embodiment of the invention.

Figure 4A:
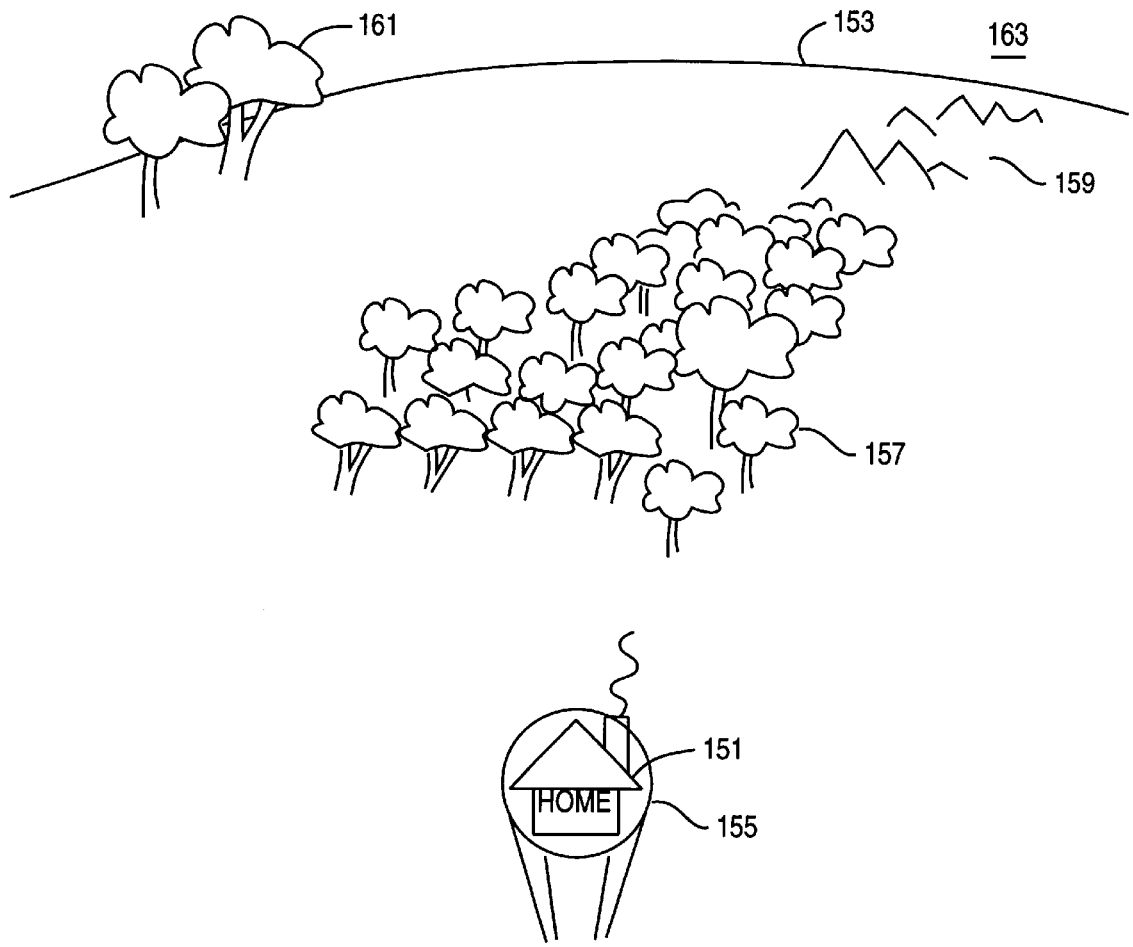
FIGS. 4A–4G depict the global history view window as the user browses the World Wide Web.

In FIG. 4A, a detailed depiction of the global history window is shown. At this point, the user is on the home page of the browser. Most browsers allow the user to set one URL as the home page to presented upon invocation of the browser. The home page is represented by the home icon 151. While this illustration, the home page is represented by a small cottage with a smoking chimney, the reader should understand that a wide variety of home icons are possible. Some of these icons may display some data specific to the home web page such as the URL of the home page.

In the preferred embodiment, the global history window is designed to have the effect of the user hovering a short distance above the ground of a slightly curved surface 153 as if in a small flying vehicle. A searchlight icon 155 indicates the present URL displayed in the main window. Alternate indicia such as a cross hairs icon can be substituted for the searchlight icon 155 to indicate the user's position. A control panel of the flying vehicle can be shown having data readouts which contain information about the page or progress in retrieving a new page. Self powered flight is possible; an icon in the shape of a shadow of a winged human could be displayed proximate to the icon representing the current user position.

The curved surface 153 preferably has features which help indicate the movement of the global history map as new sites are visited by the user. In the figure, the features are shown as a forest 157, mountain range 159 and storm 161. Slight texturing or differences in coloration of the curved surface are also possible. The use of periodic landmark icons such as the features 157, 159, 161 is helpful to orient the user. Other landmark icons such as buildings, lakes, canyons, bridges and so forth can be used. Well known landmarks such as the Empire State Building, Eiffel Tower or Taj Mahal could be used. Much like how people orient themselves in real life, the user can recall that the web site in which he interested is near the red building, for example. It is helpful that the landmark icons are distinctive from each other.

In the preferred embodiment, the sky and ground in the distance is dark indicating unexplored territory. The darkness is preferably proportional in the distance from the home and the present position. Thus, the color or shading of the sky and the ground can be used to further orient the user.

Figure 4B:
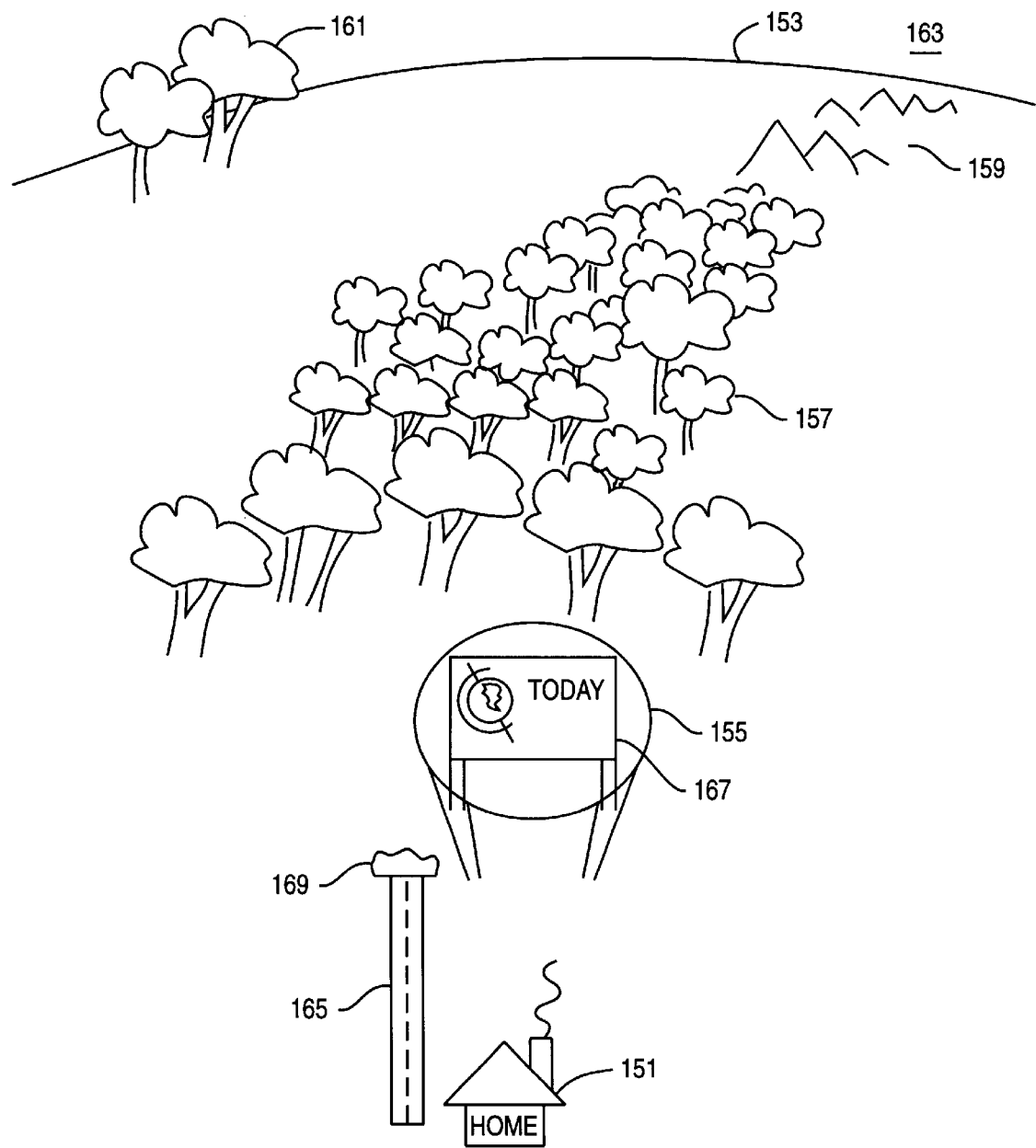

The global history map changes as the user requests a new web page from a new URL. In FIG. 4B, the user has requested a web page from WORLD TODAY, a news service organization. As the web page is retrieved, a road 165 is built. The progress of the road building indicates the progress of the browser in retrieving the web page. Suitably entertaining animations (not shown) and sound clips such as miniature workers and construction equipment with construction noises can keep the user amused during the retrieval process. They also provide secondary progress indicators.

Once the web page has been retrieved, an icon 167 representing the web page is created. This can be accomplished in many ways. A title of the web page can be used. A prominent image, e.g., a gif, from the page can be sampled and rendered in miniature form. Usually, the most suitable graphics will be found near the top of the page. Data from the page such as the URL can be excerpted. The page itself can be miniaturized to an icon like form. In one preferred embodiment, a special tag is used in HTML to indicate one or more images to use as the icon in the global history map. A first detailed image can be used when the user is located at the icon which represents the web page; a second image can be used in more distant views of the icon. In the figure, a small billboard icon 167 is created with a picture indicative of the web page. The process of creating the icon 167 can also be animated with miniature workers, sawdust and paint and so forth.

While the figures show miniature billboards as the icons which represent the web pages, those skilled in the art would appreciate that alternative representations are possible. Some of the these alternatives include buildings, murals, photographs, framed works of art, television monitors and so forth. It is possible that a mixture of icons representing the web documents is possible. However, if too many types of web icons are used, there is a risk that they will be difficult to distinguish from the landmark icons.

An end of the road icon 169 is placed at the road terminus. In the figure, it is shown as a pile of dirt, although other representations are possible, such as a road block barrier. Also, the searchlight icon 155 is moved to the WORLD TODAY billboard icon 167 as the web page is presented in the main window. In the preferred embodiment, the icon of the current page is shown larger than other icons, allowing more detail to be displayed. This is particularly useful in navigation. In the cockpit embodiment, the data readouts change to present the information of the new page. With the movement of the user's position to the new web site icon 167, the map and the globe rotate and the relative positions of the features 157, 159 and 161 change with respect to the user's position in the window.

Figure 4C:
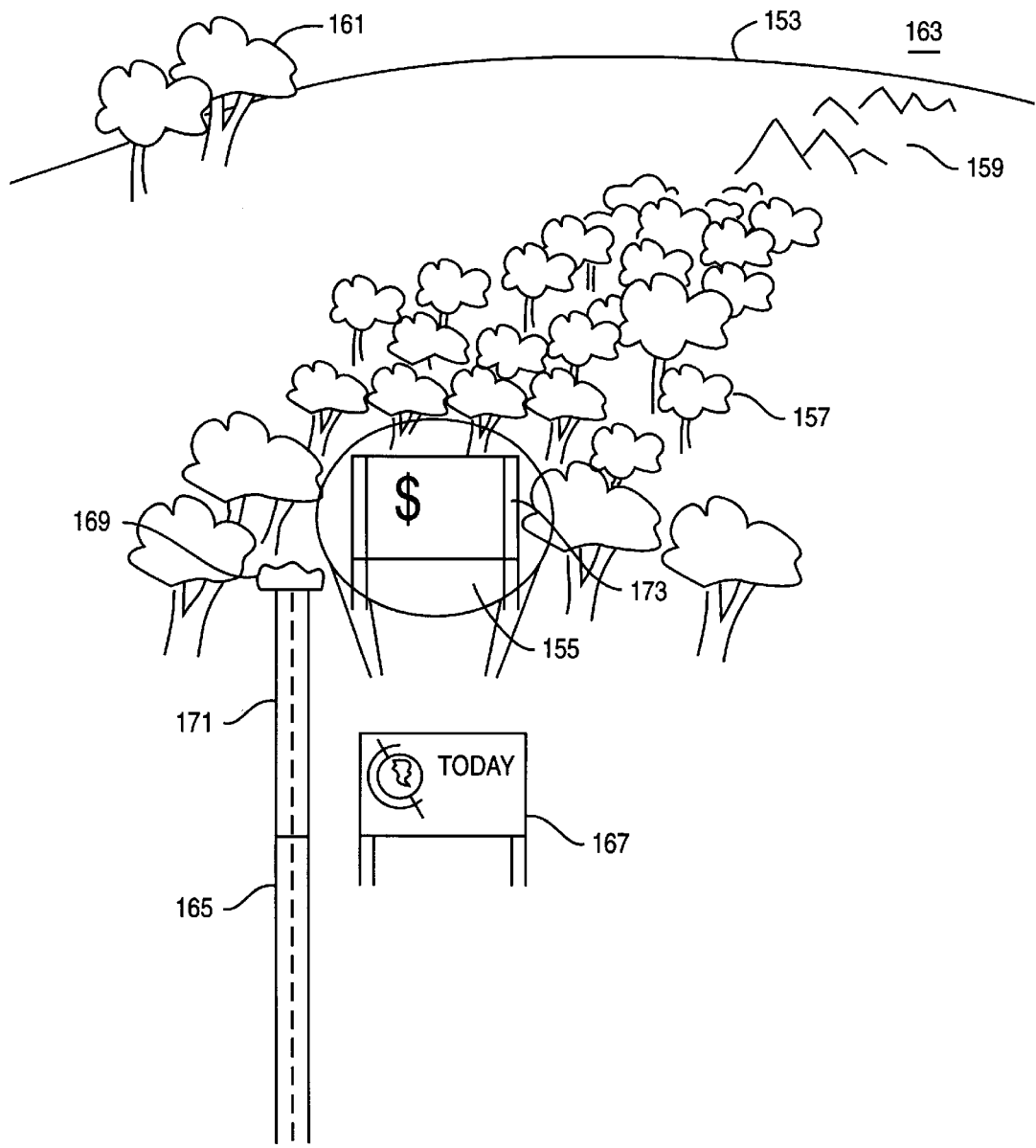

In FIG. 4C, the user has selected a financial page from the main WORLD TODAY web page. In the figure, a new section of road 171 has been built through the forest 157, perhaps with the aid of miniature lumberjacks, connecting the WORLD TODAY icon 167 with a newly built icon 173 representing the financial page. The new road section 171 may differ in appearance from the road section 165 connecting the home page icon to the WORLD TODAY icon 167. This may indicate the different browser mechanisms used for retrieving the respective web pages. For example, the WORLD TODAY web page could be retrieved by means of typing a URL from the home page versus retrieving the financial web page by means of a hyperlink. As both actions have occurred in the same session, in the preferred embodiment, the roads will be presented in the same color. Frequently traversed links may gradually become wider. For example, the typical road may eventually become a six lane highway. Links which are rarely traversed may become cowpaths.

In FIG. 4C, the end of the road icon 169 has been moved to a new position. The searchlight icon 155 has been moved to the financial page icon 173 since it is now displayed in the main window. The searchlight icon can move with the road building, indicating the user's progress to the new site. Also, the features 157, 159 and 161 have moved with the rotation of the global history map.

Figure 4D:
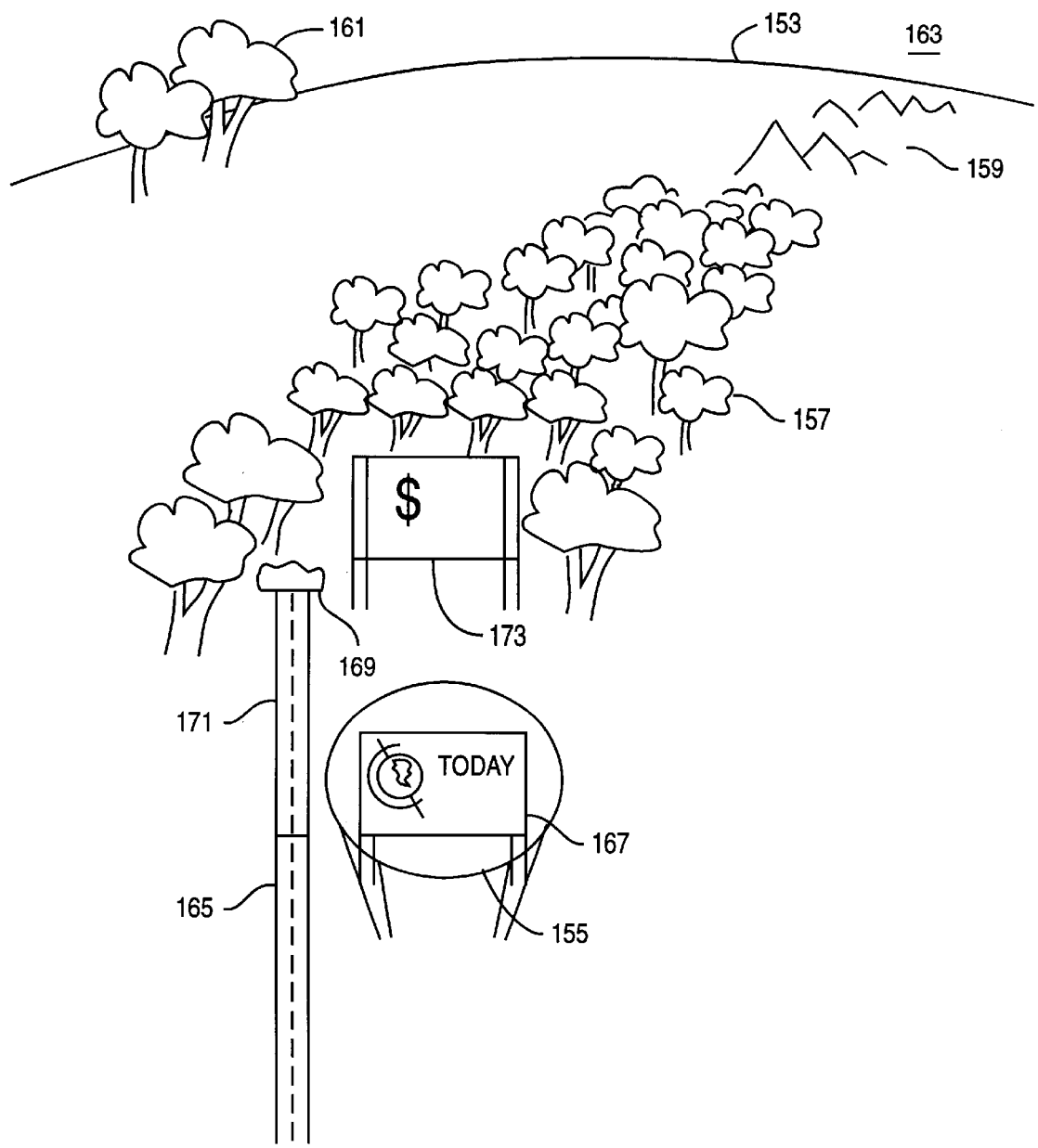

FIG. 4D shows the global history window after the user has selected the "back" button in the browser, bringing the WORLD TODAY main web page back to the browser main window. In this picture, the searchlight icon 155 has been moved back to the WORLD TODAY icon 167. The features 157, 159 and 161 have receded somewhat as the surface rotates back. The WORLD TODAY icon 167 is shown larger as it is currently the focus of the user's attention. Note that the end of the road icon 169 remains positioned at the terminus of road segment 171 since it represents the farthest browsing in that direction.

Figure 4E:
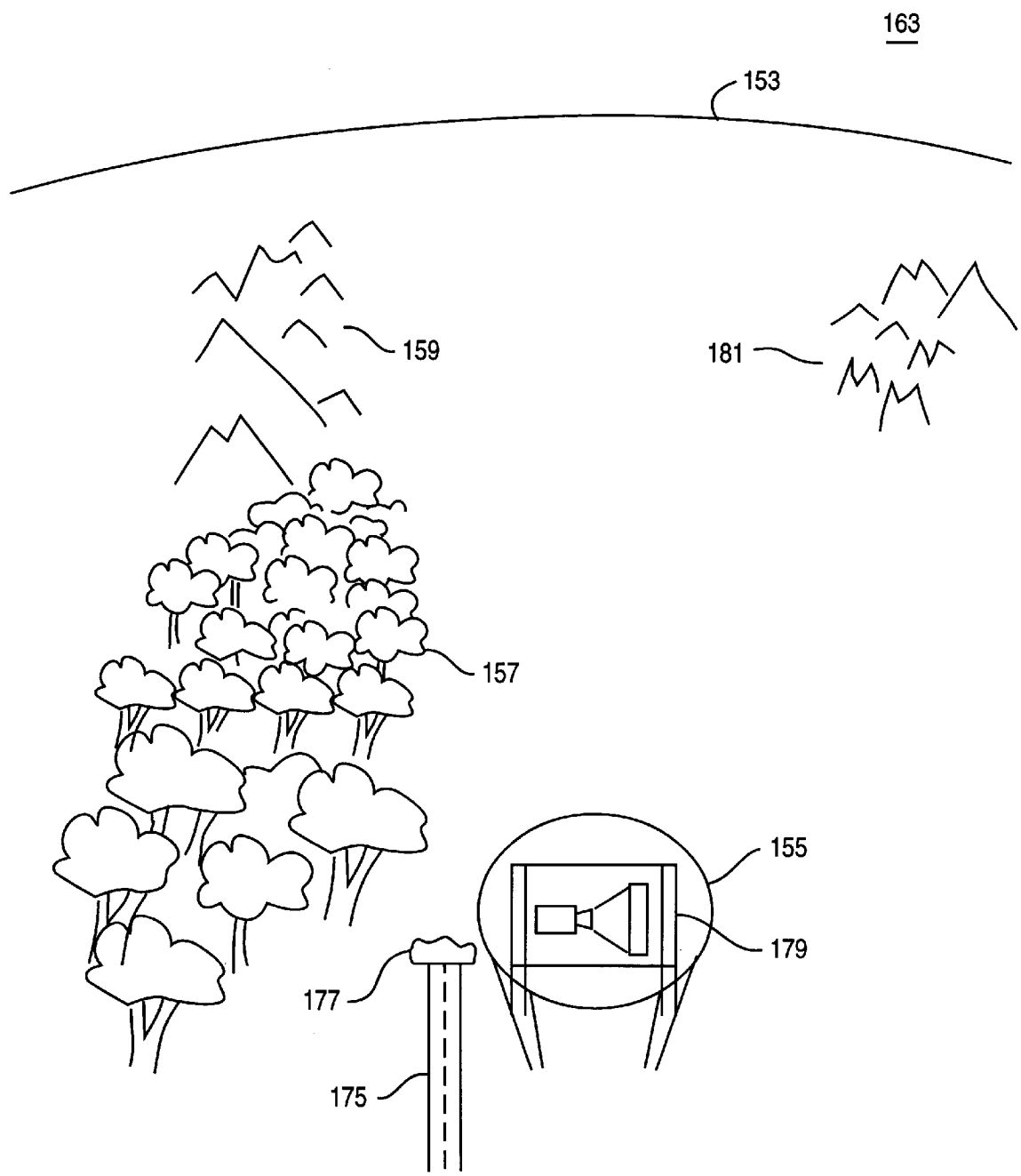

FIG. 4E shows the global history window when the movie web page is invoked from the WORLD TODAY web page. In this figure, a new road segment 175 complete with a terminating end of road icon 177 is shown connecting a new billboard icon 179, representing the movie web page, with the main page icon which is off screen. The searchlight icon 155 is moved to the movie billboard icon 179 once the movie page is presented in the browser main window.

In this simple example, the global history map presentation could easily show a road being built to the side of already existing roads and icons. However, by showing only the new road segment 175 when the browser retrieves web pages along a new branch, repositioning of the unseen icons is easier to accomplish in a seamless manner when the user backtracks to previously visited sites. In the figure, the features 157 and 159 have rotated in a counterclockwise direction. The storm 161 is no longer visible having rotated off screen. A new mountain range 181 has rotated in view.

Figure 4F:
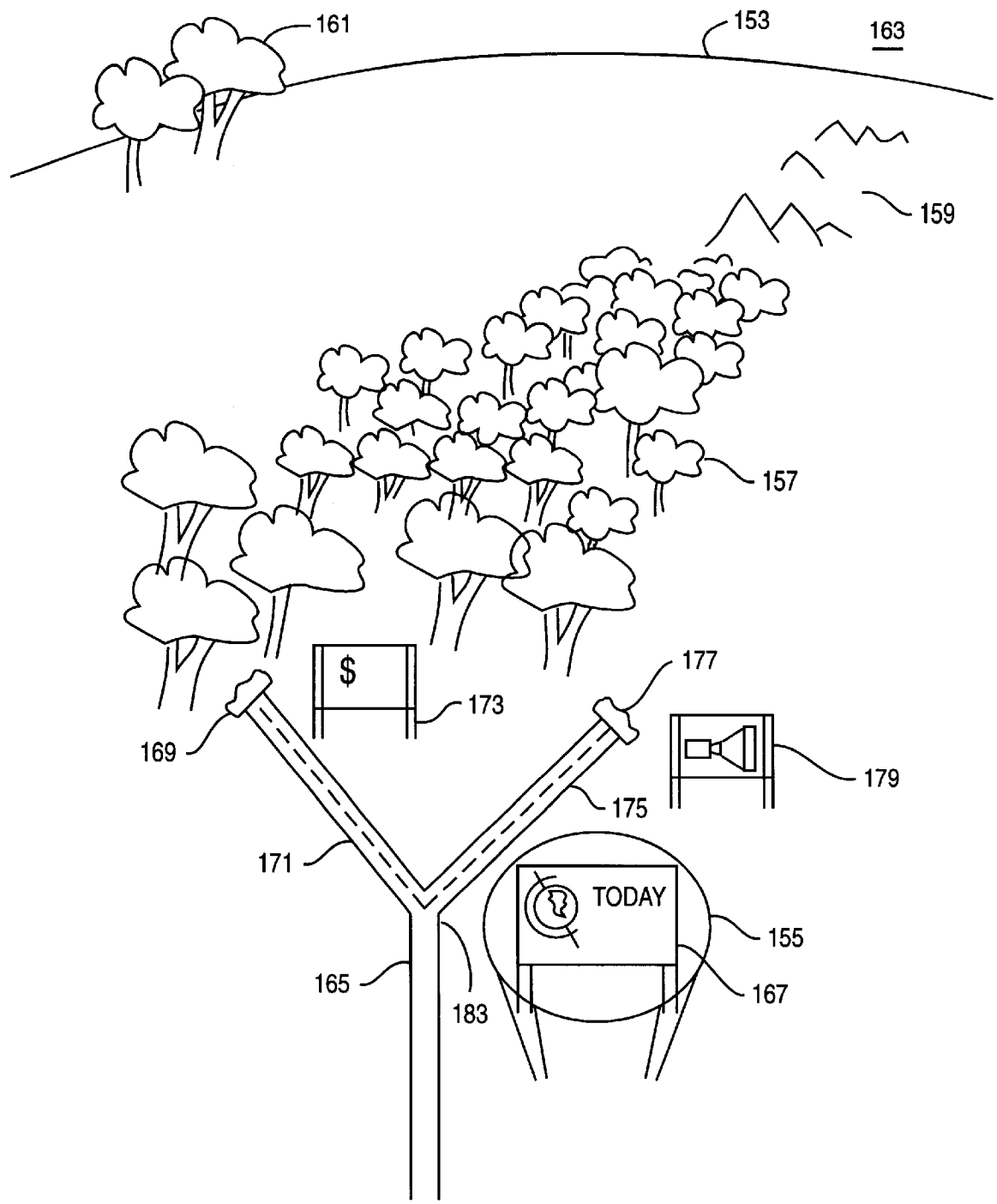

FIG. 4F shows the global history map after the user has selected the back button of the browser from the movie page, returning to the main WORLD TODAY page from the movie page. Note that the existing road segments and web site icons have been repositioned somewhat. There is now a fork 183 in the road, indicating that the user has taken two paths from the WORLD TODAY web page. The left fork is comprised of road segment 171, road terminus icon 169 and the financial page icon 173. The right fork is comprised of road segment 175, road terminus icon 177 and movie page icon 179. Note that the searchlight 155 is on the icon 167 for the main web page for WORLD TODAY and that the icon 167 is shown larger than the other web page icons 173 and 179.

Figure 4G:
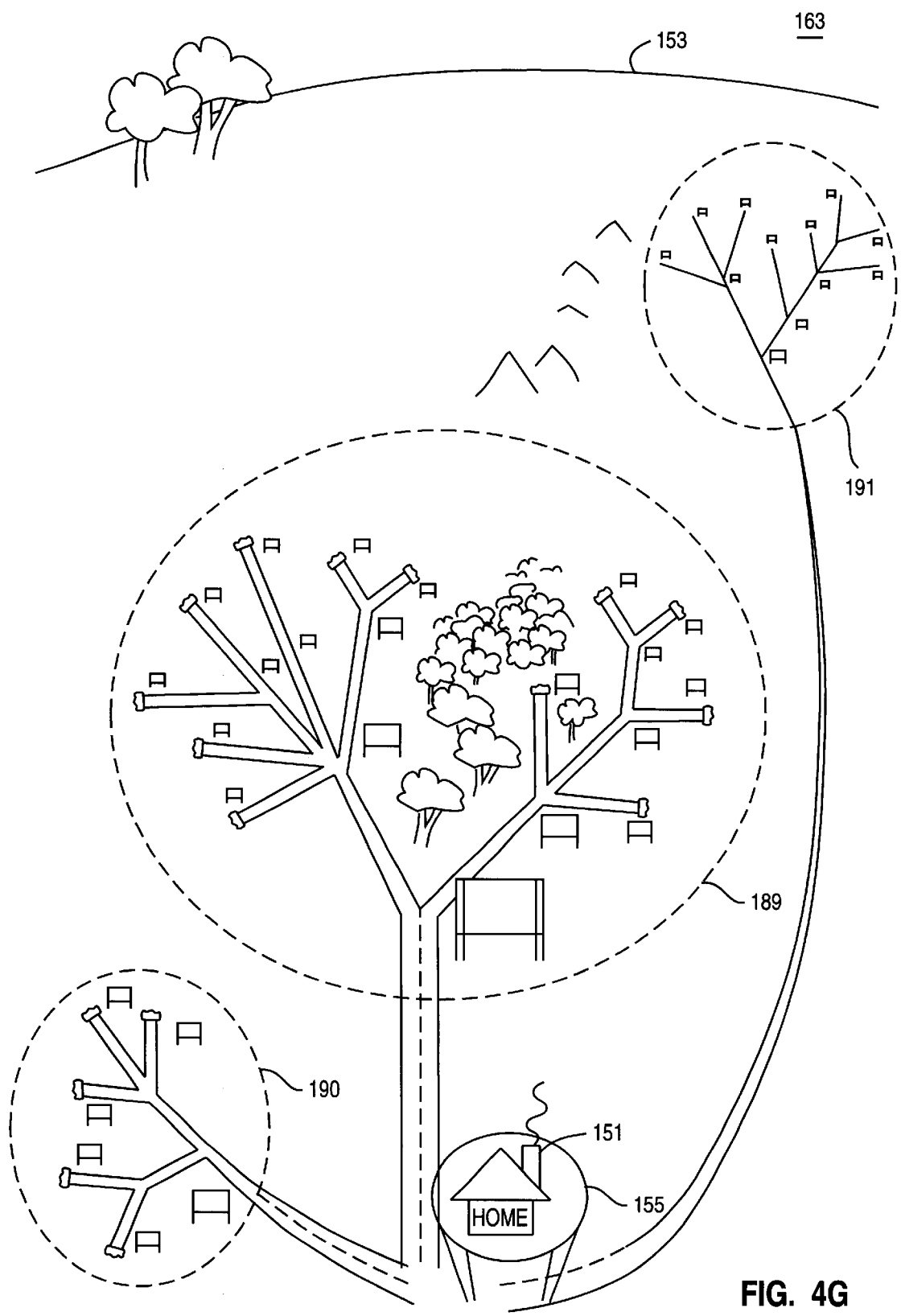

In the example above, repositioning of the icons and road segments was not necessary. The road segment 175 could have been easily built at a right angle to the existing road. However, as can be seen in FIG. 4G. the global history map can grow quite complicated. In this figure, the user is currently viewing the home web page. Consequently, the searchlight icon 155 is on the home page icon 151. In the distance, the user can see the roadway trees 189 and 190 built for the current session as well as a roadway tree 191 from a prior session. In the preferred embodiment, the two trees 189, 190 for the current session are presented in the same color. The roadway tree 191 in the background is presented in a different color to aid the user in distinguishing between web sessions.

It should be appreciated that without at least periodic repositioning of roadways and web icons, it will be difficult to portray the global history map. The slight curve of the map aids in repositioning and spacing the icons and roadways. Over time, as more and more web sites are visited from the same web page, the angle between roads will decrease to accommodate new web site icons and roadways. The length of the road segments can be varied to stagger web site icons to allow a more dense packing.

The example given in FIG. 4G is actually a simple map compared to the growth of the global history view after a protracted web search session or a series of web sessions. In one preferred embodiment of the invention, only the icons within a certain number of links, e.g., four, are shown in any detail. The rest recede in the distance as a colored web of lines or possibly disappearing over the horizon.

In the preferred embodiment, multiple visits to the same web page along the same link do not cause a change in color from the old session color to a new session color, although this would be possible. Nor does the global history map start a new tree for visits to the same page. New roads could be built if the user visited the web page along a new link. As mentioned above, repeated visits to the same web page can cause the existing road to widen.

Once the global history map is created, the user can revisit web sites previously visited by navigating to the icon representing a particular desired web site. As the user passes over web sites, the map adjusts so that the icon under the searchlight is shown larger, possibly with more details, than any other icon. Those icons closer to the current position are also shown somewhat larger, while distant web site icons fade away, disappearing from view with sufficient distance. When the user changes the orientation of the map so that he faces the home page icon, the sky becomes lighter, indicating that he is entering explored territory. Thus, the sky is also a means of navigating through the global history map.

Figure 5:
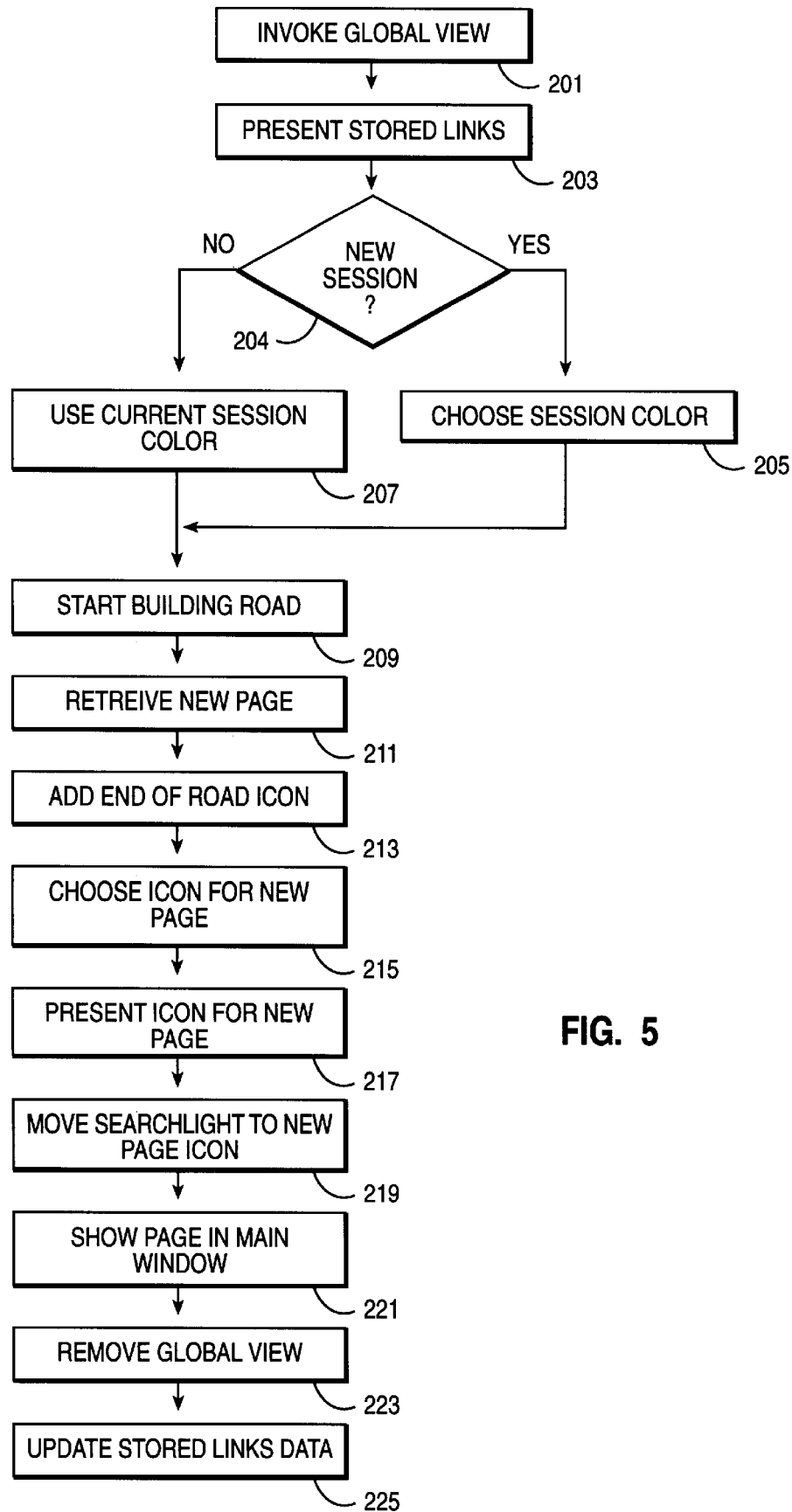
FIG. 5 is a flow diagram of the process for retrieving a new web page according to the present invention.

A sample flow diagram is shown in FIG. 5 illustrating the process for displaying the global history window when a new web page is being retrieved. In step 201, the global history window is invoked by the request to retrieve a new web page. The process of presenting the stored links is represented as step 203; the process is shown in greater detail in FIG. 6. In step 204, a test is performed to determine whether this is a new session. If so, in step 205, a new session color is chosen. A dialog box could be presented to the user to allow a choice between several colors. Alternatively, the system can choose the next color in a list of default colors chosen for maximum contrast between sessions. In step 207, the current session color is set for road building. Although not pictured, if the global history map portrays different modes of link creation, i.e. hyperlink vs. typing the URL, with different types of road segments, the mode of link creation is used to create the appropriate appearance for the road segment for the current link.

In step 209, using the current session color and the road type, if any, the global history window starts building the road for the current link. As mentioned above, the animation for road building is a progress indicator for the progress of the browser in retrieving the web page, step 211. Once the process of retrieving the web page is complete, the end of the road icon is added, step 213, to indicate completion of the task. Next, a new icon for the newly retrieved page is chosen, step 215. There may be certain aspects of the icons which are standard for every web page, e.g., the billboard format depicted in FIGS. 4A–4G, but at least some of the icon should be particular to the web page to help the user identify the web page in the future. Also, the presentation in its enlarged state under the focus of the user may have greater detail than those in the distance. Thus, more than one icon may be created and stored for a given web site. In step 217, the new icon is presented.

In step 219, the searchlight, or other focus indicator, e.g., magnifying glass, change of color, is moved to the new page icon. In step 221, the retrieved web page is shown in the main window. After a period of time, the global history view is removed from or minimized on the display so that the user may more easily read in the main window. In step 225, the stored link information is updated to include the newly retrieved web page in the global history map data.

Figure 6:
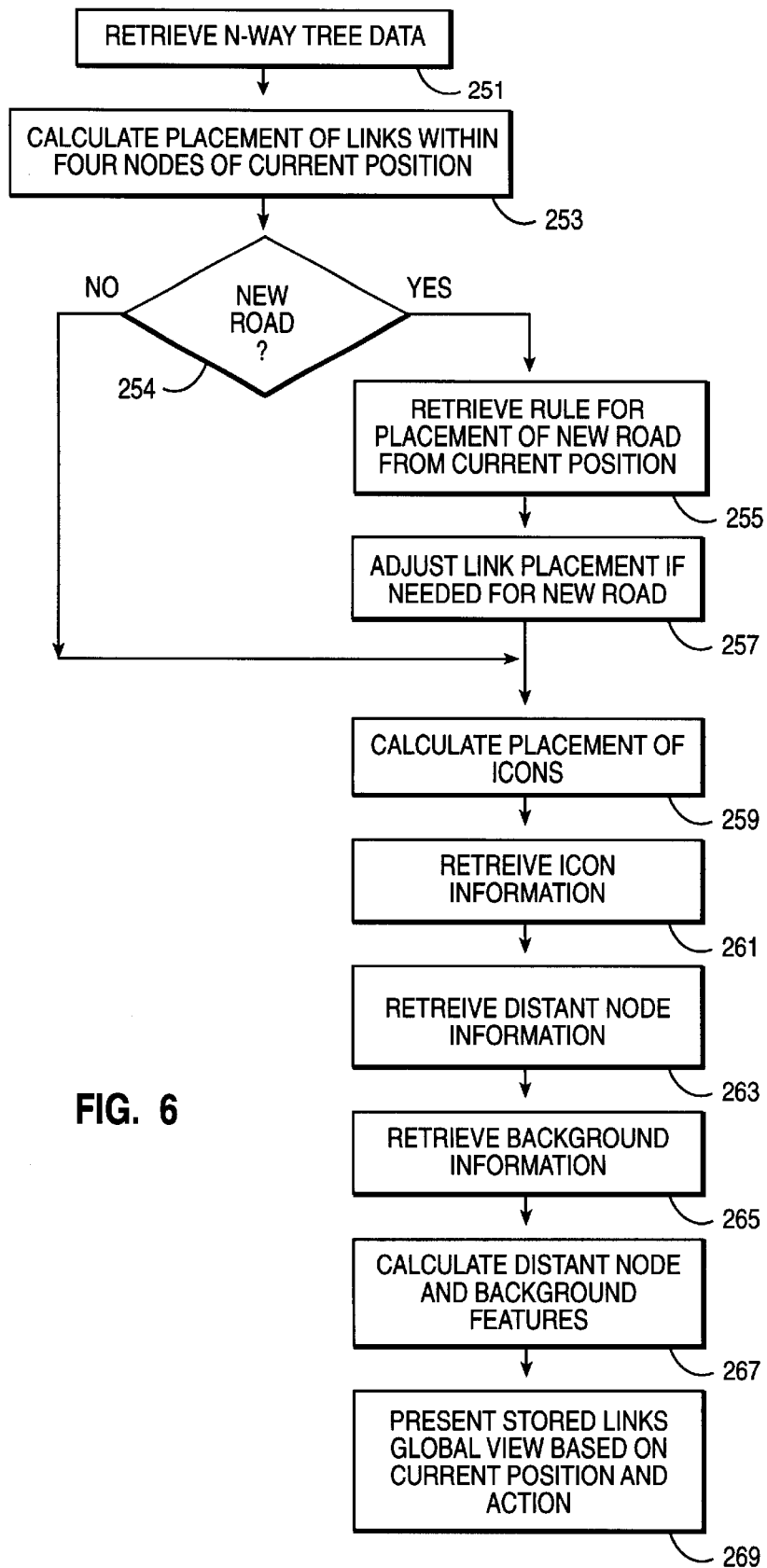
FIG. 6 is a detailed flow diagram of the process for retrieving and presenting the stored links in the global history view window.

In FIG. 6, a preferred process for the retrieval and presentation of the historical data for the global history map is depicted. In step 251, the historical data is retrieved for presentation. In the preferred embodiment, the historical data is stored in an N-way tree structure. Depending on the data already retrieved for presentation for the prior position and the additional data needed for the presentation of the global history map for the new position, the data retrieved can be selective when compared to the entire historical tree. For example, if the presentation data already comprises all the data for all pages, except for one page in the direction of movement of the user, only that information need be retrieved.

In step 253, the placement of links to nearby pages is calculated. In one preferred embodiment, the icons for web pages and their associated roads within four links of the current page in the direction of the user's view are placed so that they can be distinguished from other web pages with relative ease. More distant nodes are not necessarily even visible.

In step 254, a test is performed to determine whether a new road and icon is to be placed. If this is true, in step 255, the placement rule for a new road is retrieved from a user profile. The invention includes the capability that the user can set a rule such "Add new roads to right" so that the user will know that the order of links traversed from the same page will always be from left to right. Other rules include adding roads to the left or an alphabetical order to the roads. Depending on the rule and the number of sites already visited, the link placement may need to be adjusted for the new road, step 257.

In step 259, the placement and size of the web page icons is calculated based on the link placement and their relative distance from the current position. In step 261, the icon information indicating the pictorial or text matter of each icon is retrieved. In step 263, the distant node information is retrieved. The background information such as the landscape features is retrieved in step 265. The retrieved information is used to calculate the placement of the distant node and features in the global history view.

In step 269, the global history view is presented according to the retrieved data and calculations thereon and the action being presented. For example, as shown in FIG. 4E, when building a new road in a new direction, much of the old web link information need not be shown. However, if the global view is being used in navigation mode to travel back to previously visited sites, much of this information must be presented. Therefore, while some of the calculations discussed above may be omitted when presenting a new link, it is preferred to perform these calculations in anticipation of backward navigation by the user.

Figure 7:
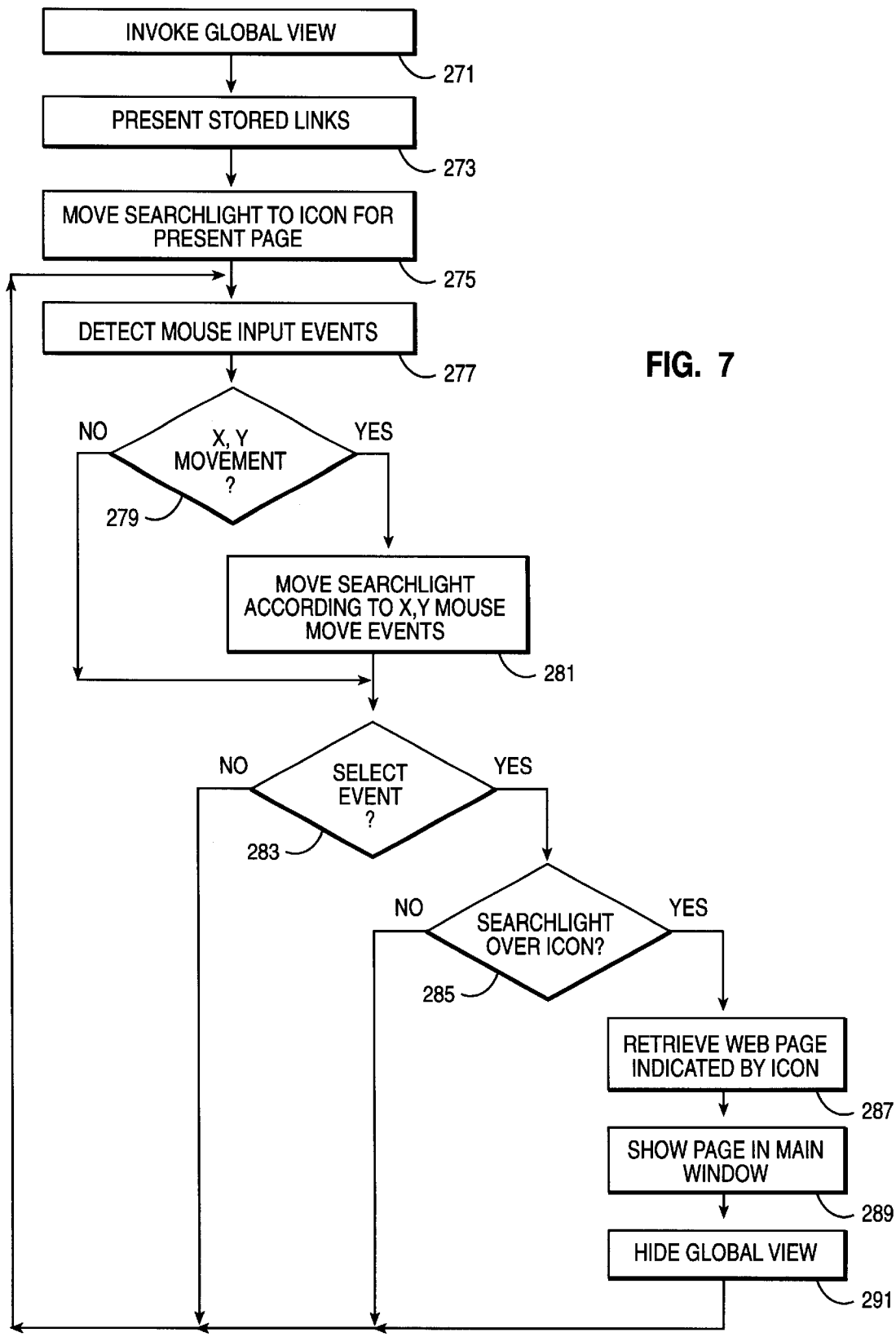
FIG. 7 is a flow diagram of the process for using the global history window to retrieve a web page at a previously viewed Web site.

Navigation within the global history window is depicted in the flow diagram of FIG. 7. The flow diagram starts with the invocation of the global history window in step 271. As discussed above, this can be accomplished by selection of a menu item or a user interface control. Navigating through the global history map can be accomplished by mouse events with a mouse button being held down. In step 273, the stored links are presented in the global history window. The searchlight icon is moved to the present web page icon, step 275. Next, mouse events are directed to the global history window. In step 277, a mouse event is detected. Step 279 tests whether the mouse is an x, y movement with a button down. If so, the searchlight icon, indicating the current position of the user is moved according to the mouse event. If not, step 283 tests whether the mouse event is a select event. If it is a select event, the test in step 285 determines whether the searchlight is over a web page icon. If so, step 287 retrieves the web page indicated by the icon. If not, the method returns to detect more mouse events. In step 289, the web page is shown in the main window. After a period of time, in step 291, the global history window is hidden or minimized to allow the user to focus on the page in the main window. As mentioned above, after a long period of inactivity, indicating that the user is no longer interested in the web page, the global history window may be shown to the user.

Figure 8:
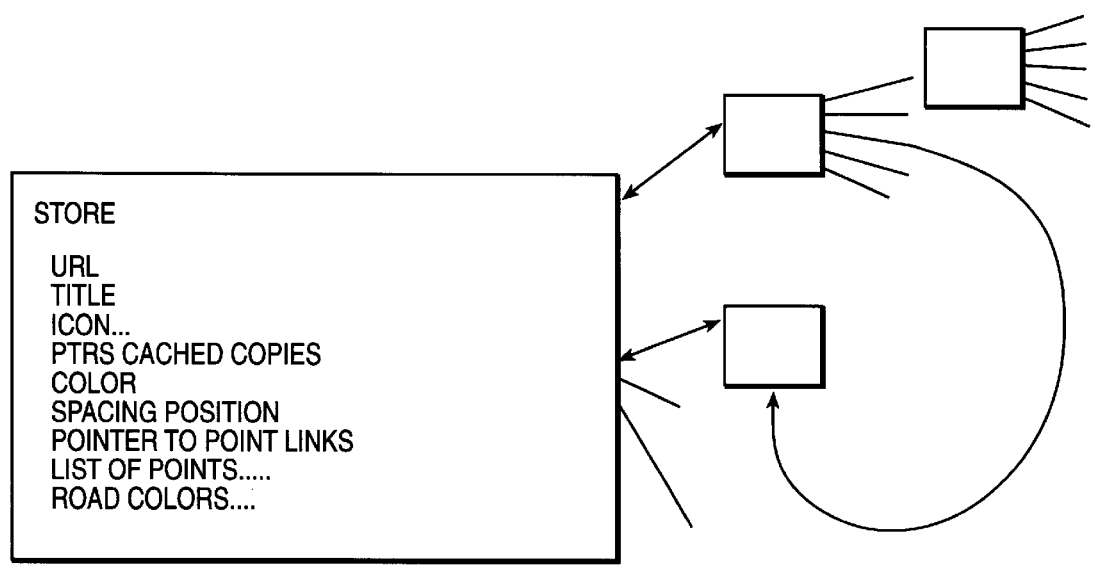
FIG. 8 depicts the N-way tree used to stored the history information for previously viewed links.

Although a number of suitable data structures can be used to store the information needed for the global history map, in the preferred embodiment, an N-way tree structure is used. As shown in FIG. 8, an N-way tree structure can be represented as a set of nodes 300–310 connected by a set of connecting links 313–323. Each node stores the information associated with each node including the links which connect to it. For example, each node could store the following information:

The URL for the web page;
The title of the web page;
The icon(s) for the page;
Pointers to cached copies of the page;
Current or relative spacing and position to other icons;
Pointer(s) to the originating link(s);
Pointer(s) to the links created from page in order of creation;
Colors and creation mode for links created from page. The use of this information in constructing the global history view should be self explanatory to those skilled in the art. When the system detects that the user has moved the window in the direction of undisplayed links and icons, the information for these links and icons is retrieved to make the appropriate calculations and presentation.

After a period of time, the user may wish to prune icons representing particular sites or entire trees representing a web session from the global history map. This can be accomplished through the use of a pulldown menu item. The user navigates to the site to be deleted, invokes the pulldown menu and is presented with options to delete the site or the session to which it belongs. Depending on the option chosen the web site or session is deleted. Suitably entertaining animations in the global history map can accompany these operations, from minor explosions for a web site deletion to major natural disasters for deletion of an entire tree.

It is also a relatively frequent occurrence that a previously visited site no longer exists. Once such a site is discovered by the browser, it can be removed from the global history map either automatically or in response to a user input assenting to its removal. Animations such as dismantling the billboard icon or blowing it up can be used to denote this fact in the global history map.

A key window for indexing the colors used for different sessions by date can be also made available to the user. This aids in understanding which colors represent different browsing sessions. The key window can also contain graphics for the mode type of the roadways, e.g., dotted stripes down the middle mean hyperlink invocation while a six lane highway means a heavily travelled link.

In the preferred embodiment, the global history map is presented as a virtual reality environment. The Virtual Reality Modeling Language (VRML) is one known language for creating such 3-D environments. VRML allows the user to create scenes including a set of objects, lighting effects and even environmental conditions such as fog.

Each object such as a landmark icon or web icon would be described as a one or more nodes in VRML. Shape nodes give an object their shape; property nodes give objects their color, texture, size and so forth. VRML 2.0 contains script nodes which contain executable code to build dynamic worlds. VRML script nodes can call Java methods, and Java code can call VRML script nodes through the use of the VRML 2.0 Java API. Thus, VRML is easily manipulated through Java and easily incorporable in a browser which accepts Java plug-ins.

Alternatively, there are computer game engines which computer game developers use to develop computer games such a Doom or Descent which could be used to implement the invention. Indeed, depending on the quality of the animation and sound clips, at least for younger Web browsers, the global history map can be become more interesting than the actual information retrieved from the Internet.

The use of an apparently curved surface is an important feature of the preferred embodiment of the present invention. It allows readjustment of links which are not currently visible. The curved surface itself has more apparent surface area than a flat surface. However, The invention should not be construed to be limited to a curved surface. The invention could be implemented as a road map on flat surface wherein roadways (links) connect cities (web sites). In this embodiment of the invention, readjustment of the web sites and roadways can be accomplished when the existing sites are scrolled beyond the boundaries of the global history map window. Similar landmark icons and animations are possible.

While the preferred embodiment of the invention is related to browsing for information in the Internet, and more specifically the Web, the invention can be used for browsing through any distributed database. It is expected that the Web metaphor will become more prevalent in time. Many of the databases which currently exist in other formats will be rendered into a set of hyperlinked documents which can be browsed much like web pages. The reader is reminded that the Internet protocols include FTP and Gopher as well as HTTP and HTML generally used in the Web. Future browsers may use dynamic HTML and XML in addition to HTML. These and other protocols as yet not widely implemented in the Internet can be adapted according to the principles of the current invention.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for portraying a history of browsing web pages in a distributed database, comprising the steps of:

in a browser window, presenting web pages from the distributed database in response to user input;

in a global history window, presenting a virtual reality display representative of a history of browsed web pages, wherein;

as each web page is browsed, creating and presenting a sign having an icon representative of content in the browsed page;

as each traversal is made between web pages, creating and presenting a roadway connecting points proximate to individual signs; and presenting a current user position in the virtual reality display on a roadway proximate to a sign representative of the web page currently displayed in the browser window.

2. The method as recited in claim 1 further comprising the steps of:

in response to a request for retrieval of a new web page, in the virtual reality display, presenting building of a new roadway as a progress indicator for retrieving the new web page;

in the virtual reality display, creating and presenting a new sign having an icon indicative of the content of the new web page proximate to a terminus of the new roadway; and changing the current user position to be at the terminus of the new roadway.

3. The method as recited in claim 2, further comprising the step of presenting an end of road icon at the terminus of the new roadway once the new web page is retrieved.

4. The method as recited in claim 2 further comprising the steps of:

determining that placement of the new sign and the new roadway within the virtual reality display requires that existing signs and roadways be relocated;

while presenting the creation of the new sign and new roadway, calculating new positions for existing signs and roadways; and when the user moves his current position in the virtual reality display proximate to one of the existing signs, presenting at least some of the existing signs and roadways at their new positions.

5. The method as recited in claim 1 further comprising the step of creating and presenting a landmark icon in the virtual reality display, wherein the landmark icon is unrelated to data in the distributed database and serves to orient a user in the virtual reality display.

6. The method as recited in claim 1 wherein the virtual reality display is presented on an apparently curved surface to resemble a surface of a planet.

7. The method as recited in claim 1 further comprising presenting the deletion of a web page from the browsing history, wherein the sign associated with the deleted web page is removed from the virtual reality display while being presented to the user.

8. The method as recited in claim 1 further comprising the steps of:

selecting a surface of a roadway according to a session in which a web page was browsed; and presenting the roadway according to the selected surface.

9. The method as recited in claim 1 further comprising the steps of:

selecting a surface of a roadway according to a traversal means used to retrieve a web page; and presenting the roadway according to the selected surface.

10. The method as recited in claim 1 further comprising the steps of:

selecting a surface of a roadway according to a number of times a web page has been accessed; and presenting the roadway according to the selected surface.

11. The method as recited in claim 1 further comprising the steps of:

automatically bringing the global history window on top of a user interface when a request for retrieval of a web page is detected; and automatically bringing the browser window on top of a user interface after the retrieval of the web page is complete.

12. A system including memory, processor, user input device and display for portraying a history of browsing web pages in a distributed database, comprising:

means for presenting in a browser window web pages from the distributed database in response to user input;

means for presenting in a global history window a virtual reality display representative of a history of browsed web pages;

means for creating and presenting as each web page is browsed a sign having an icon representative of content in the browsed page;

means for creating and presenting as each traversal is made between web pages a roadway connecting points proximate to individual signs; and means for presenting a current user position in the virtual reality display on a roadway proximate to a sign representative of the web page currently displayed in the browser window.

13. The system as recited in claim 12 further comprising:

means responsive to a request for retrieval of a new web page for presenting building of a new roadway in the virtual reality display as a progress indicator for retrieving the new web page;

means for creating and presenting a new sign having an icon indicative of the content of the new web page proximate to a terminus of the new roadway in the virtual reality display; and means for changing the current user position to be at the terminus of the new roadway.

14. The system as recited in claim 13, further comprising means for presenting an end of road icon at the terminus of the new roadway once the new web page is retrieved.

15. The system as recited in claim 13 further comprising:

means for determining that placement of the new sign and the new roadway within the virtual reality display requires that existing signs and roadways be relocated;

means calculating new positions for existing signs and roadways while presenting the creation of the new sign and new roadway; and so that when the user moves his current position in the virtual reality display proximate to one of the existing signs at least some of the existing signs and roadways are presented at their new positions.

16. The system as recited in claim 12 further comprising means for creating and presenting a landmark icon in the virtual reality display, wherein the landmark icon is unrelated to data in the distributed database and serves to orient a user in the virtual reality display.

17. The system as recited in claim 12 wherein the virtual reality display is presented on an apparently curved surface to resemble a surface of a planet.

18. The system as recited in claim 12 further comprising means for presenting the deletion of a web page from the browsing history, wherein the sign associated with the deleted web page is removed from the virtual reality display while being presented to the user.

19. The system as recited in claim 12 further comprising:
means for selecting a surface of a roadway according to a session in which a web page was browsed; and
means for presenting the roadway according to the selected surface.

20. The system as recited in claim 12 further comprising:
means for selecting a surface of a roadway according to a traversal means used to retrieve a web page; and
means for presenting the roadway according to the selected surface.

21. The system as recited in claim 12 further comprising:
means for selecting a surface of a roadway according to a number of times a web page has been accessed; and
means for presenting the roadway according to the selected surface.

22. The system as recited in claim 12 further comprising:
means for automatically bringing the global history window on top of a user interface when a request for retrieval of a web page is detected; and
means for automatically bringing the browser window on top of a user interface after the retrieval of the web page is complete.

23. A computer program product in a computer memory for portraying a history of browsing web pages in a distributed database, comprising:
means for presenting in a browser window web pages from the distributed database in response to user input;
means for presenting in a global history window a virtual reality display representative of a history of browsed web pages;
means for creating and presenting as each web page is browsed a sign having an icon representative of content in the browsed page;
means for creating and presenting as each traversal is made between web pages a roadway connecting points proximate to individual signs; and
means for presenting a current user position in the virtual reality display on a roadway proximate to a sign representative of the web page currently displayed in the browser window.

24. The product as recited in claim 23 further comprising:
means responsive to a request for retrieval of a new web page for presenting building of a new roadway in the virtual reality display as a progress indicator for retrieving the new web page;
means for creating and presenting a new sign having an icon indicative of the content of the new web page proximate to a terminus of the new roadway in the virtual reality display; and
means for changing the current user position to be at the terminus of the new roadway.

25. The product as recited in claim 24, further comprising means for presenting an end of road icon at the terminus of the new roadway once the new web page is retrieved.

26. The product as recited in claim 24 further comprising:
means for determining that placement of the new sign and the new roadway within the virtual reality display requires that existing signs and roadways be relocated;
means calculating new positions for existing signs and roadways while presenting the creation of the new sign and new roadway; and
so that when the user moves his current position in the virtual reality display proximate to one of the existing signs at least some of the existing signs and roadways are presented at their new positions.

27. The product as recited in claim 23 further comprising means for creating and presenting a landmark icon in the virtual reality display, wherein the landmark icon is unrelated to data in the distributed database and serves to orient a user in the virtual reality display.

28. The product as recited in claim 23 wherein the virtual reality display is presented on an apparently curved surface to resemble a surface of a planet.

29. The product as recited in claim 23 further comprising means for presenting the deletion of a web page from the browsing history, wherein the sign associated with the deleted web page is removed from the virtual reality display while being presented to the user.

30. The product as recited in claim 23 further comprising:
means for selecting a surface of a roadway according to a session in which a web page was browsed; and
means for presenting the roadway according to the selected surface.

31. The product as recited in claim 23 further comprising:
means for selecting a surface of a roadway according to a traversal means used to retrieve a web page; and
means for presenting the roadway according to the selected surface.

32. The product as recited in claim 23 further comprising:
means for selecting a surface of a roadway according to a number of times a web page has been accessed; and
means for presenting the roadway according to the selected surface.

33. The product as recited in claim 23 further comprising:
means for automatically bringing the global history window on top of a user interface when a request for retrieval of a web page is detected; and
means for automatically bringing the browser window on top of a user interface after the retrieval of the web page is complete.

* * * * *